June 30, 1964 D. C. PRINCE, JR 3,138,921
VARIABLE AREA NOZZLE
Filed April 26, 1962 2 Sheets-Sheet 1
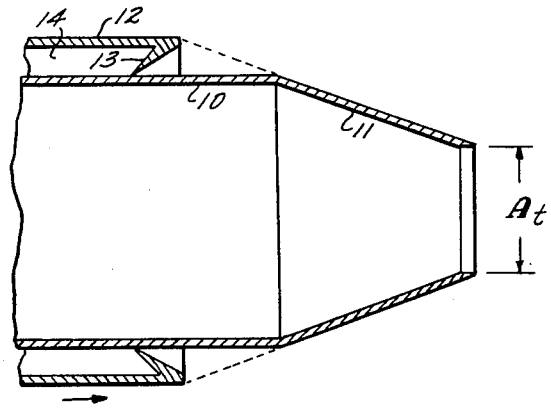
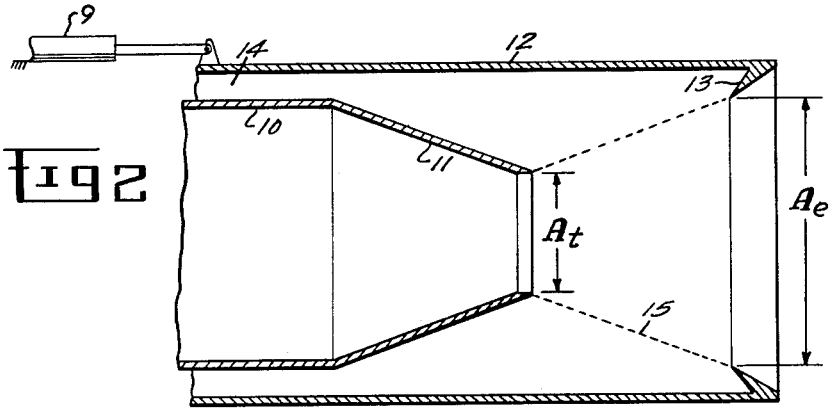
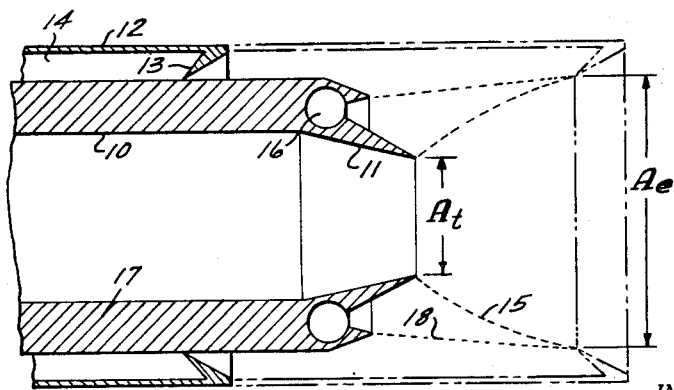
INVENTOR.
DAVID C. PRINCE, JR.
BY
ATTORNEY June 30, 1964 D. C. PRINCE, JR 3,138,921
VARIABLE AREA NOZZLE
Filed April 26, 1962 2 Sheets-Sheet 2

INVENTOR.
DAVID C. PRINCE, JR.
BY
John F. Cullen
ATTORNEY—

United States Patent Office 3,138,921
Patented June 30, 1964

3,138,921
VARIABLE AREA NOZZLE
David C. Prince, Jr., Cincinnati, Ohio, assignor to General Electric Company, a corporation of New York
Filed Apr. 26, 1962, Ser. No. 190,350
7 Claims. (Cl. 60—35.6)

This invention relates generally to variable form and area jet propulsion nozzles and, more particularly, to an improved means of providing a convergent-divergent variable area nozzle.

For reasons to be hereinafter more fully discussed, it is desirable, for efficient operation of an aircraft jet propulsion engine, to have the cross sectional area of the engine exit somewhat smaller than the maximum cross sectional area of the engine nacelle or body when the aircraft is operating at subsonic or transonic speeds. However, for efficient operation at supersonic speeds, it is desirable to have the engine exit area substantially larger than when the aircraft is operating at subsonic or transonic speeds. Since any practical aircraft which travels at supersonic speeds must travel at subsonic speeds during take-off and landings, a problem is encountered in providing a variable exit area nozzle to achieve the most efficient operation at both subsonic and supersonic speeds. Variable exit area nozzles for jet propulsion engines have been employed in the past but these have generally involved complicated and costly mechanical arrangements to either physically expand the nozzle exit to a large area or to provide an effective divergent surface from the small nozzle exit to an extendable large exit.

It is an object of this invention to provide an improved means for achieving a converging-diverging surface in a variable exit-area jet propulsion nozzle.

It is an object of this invention to provide an improved variable form and exit-area nozzle for an aircraft jet propulsion engine.

It is also an object of this invention to provide a combined jet propulsion-rocket engine with a variable form and exit-area nozzle.

Briefly stated, in accordance with one aspect of the invention, a jet propulsion engine is provided with a converging jet nozzle having an exit area smaller than the body area of the engine nacelle. A cylindrical shroud surrounds, and is radially spaced from, the nozzle and is axially movable with respect to the nozzle. An annular, inwardly projecting scoop is preferably carried by the shroud near the exit end of the shroud. With this arrangement, when the shroud is extended, the annular scoop maintains an entrapped gas region having a divergent separation surface surrounding the jet nozzle to provide an effective divergent surface from the small nozzle exit to the large shroud exit.

In accordance with another aspect of the invention, an axially movable plug is positioned within the aforementioned converging nozzle to provide a variable throat area for the converging nozzle. Furthermore, the axially movable plug carries a rocket combustion chamber which may utilize the large exit-area of the extended shroud to achieve maximum expansion. This arrangement provides a small exit-area jet propulsion engine for subsonic operation as well as the aforementioned high expansion area for supersonic rocket operation.

While the specification concludes with claims particularly pointing out and distinctly claiming the subject matter which is regarded as the invention, it is believed the invention will be better understood from the following description taken in connection with the accompanying drawings, in which:

FIGURE 1 is a fragmentary sectional view along the axis of a jet propulsion nozzle showing the extendable shroud in the retracted position;

FIGURE 2 is a view similar to FIGURE 1 but showing the shroud in the extended position;

FIGURE 3 is a fragmentary sectional view along the axis of a jet propulsion nozzle wherein a rocket combustion chamber is mounted on the nozzle with the extendable shroud shown in the retracted position in solid lines and in the extended position in phantom lines;

Figure 4:
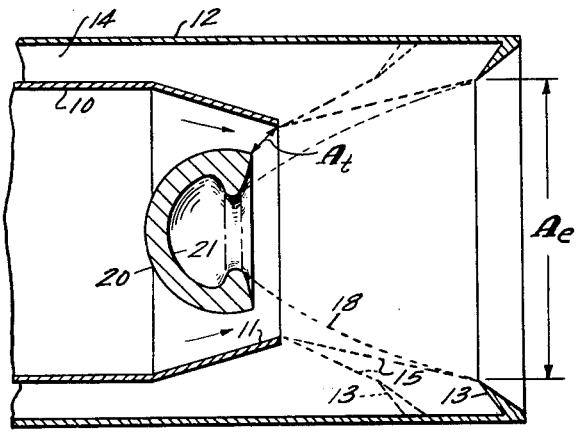
Figure 5:
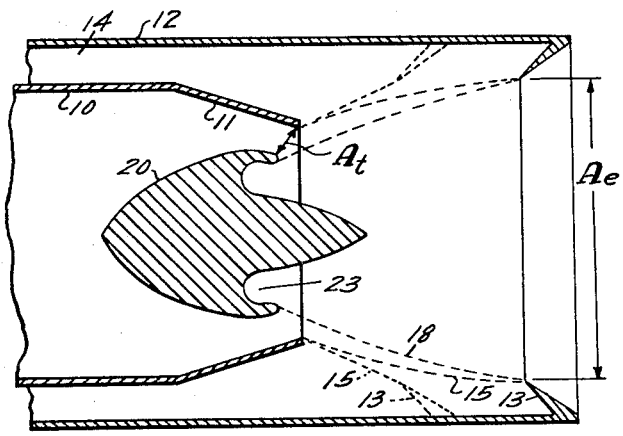

FIGURE 4 is a fragmentary sectional view along the axis of a jet propulsion nozzle wherein an axially movable plug is illustrated as comprising a central rocket combustion chamber, with the extendable shroud in the extended position; and FIGURE 5 is a view similar to FIGURE 4 showing a further embodiment of the invention wherein the rocket combustion chamber is an annulus carried by the axially movable plug.

Referring to the drawings and particularly to FIGURE 1, there is illustrated a tail pipe 10 of an aircraft jet propulsion engine. A converging surface 11 secured to the aft end of the tail pipe 10 serves as a jet nozzle. A shroud 12 is positioned so as to surround the tail pipe 10. An annular scoop 13 is provided at the aft end of the shroud 12. As can be seen from FIGURE 1, the scoop 13 projects inwardly from the shroud 12 and is angled toward the upstream end of the shroud 12 to form an acute angle with the inner wall of the shroud 12.

In the arrangement shown in FIGURE 1, i.e., with the shroud 12 in the retracted position, the exit area of the jet engine is the throat area of the converging surface 11 as indicated by $A_t$. With the shroud 12 in the retracted position as shown in FIGURE 1, the aircraft engine is adapted for most efficient operation at subsonic speeds or at speeds slightly above sonic velocity. The mechanical arrangement 9 for retraction and extension of the shroud 12 is schematically shown in FIGURE 2 and any suitable arrangement obvious to one skilled in the art may be used.

Referring now to FIGURE 2, the shroud 12 is illustrated in the extended position. With the shroud 12 in this position, the jet engine has an exit area $A_e$ which is substantially equal to the cross sectional area of the engine body, which in the present arrangement, is defined by the diameter of the shroud 12. When the shroud 12 with its scoop 13 is extended, a uniform pressure region of entrapped exhaust gas is developed, defined by the shroud 12, the converging surface 11, and a constant pressure separation surface 15 represented by the dashed line in FIGURE 2. Momentum interchange across the separation surface continuously drags air out of the entrapped gas region, trying to reduce the pressure level. Make up gas must be supplied to maintain the pressure level constant. This make up gas may be accomplished by allowing the separation surface 15 to impinge on the shroud 12 at a point upstream from the shroud end, in which case the shock created by deflection from the inner surface of the shroud is accompanied by a pressure rise which can send make up gas back through the boundary layer region on the inner surface of shroud 12. This implies an unnecessarily low pressure in the entrapped gas region and a loss in thrust. Preferably, make up gas is supplied by entrapping gas with an annular scoop for return to the entrapped gas region. It should be understood that the scoop provides a substantial increase in thrust over that which would occur without it. The scoop provides a self-regulating device in which a reduction in pressure of the entrapped gas region will lead to deflection of the separation surface into the entrapped gas region and more gas is entrapped by the scoop. It also would be possible to maintain a constant pressure in the entrapped gas region by bleeding a small amount of air into the region, for example, through the annulus 14, to compensate for that air which is entrained out of the region. This would only require the provision of a control means to govern the amount of air introduced into the region.

In accordance with the present invention, the annular scoop 13 thus magnifies the feedback of air through the boundary layer at the point of impingement of the jet shock on the extended shroud and thereby automatically maintains a separation surface essentially as illustrated in FIGURE 2. The separation surface 15 serves as a diverging surface which, in cooperation with the converging surface 11, provides a converging-diverging nozzle which in turn results in an exit area $A_e$ essentially the same size as the cross sectional area of the jet engine body.

The invention, as thus far described, is adaptable to employment with a combination air breathing jet-rocket engine. Such an arrangement is illustrated in FIGURE 3 wherein an annular rocket combustion chamber 16 exhausting downstream is mounted radially inward of the shroud and peripherally around the end of an annular structural element 17 whose inner periphery forms the jet engine tail pipe 10 and the jet engine converging surface 11. In FIGURE 3 the shroud 12 is shown in the retracted position in solid lines and in the extended position in phantom lines. As shown, with the shroud 12 in the retracted position, the jet throat area $A_t$ also comprises the exit area which is the most efficient arrangement for subsonic operation of the aircraft. When the aircraft is to be operated at supersonic speeds, the shroud 12 is extended as shown in phantom in FIGURE 3 to thereby provide an exit area $A_e$ which is substantially as large as the cross sectional area in the engine nacelle. This arrangement provides a separation surface 15 for jet engine operation in a manner similar to that discussed above. In addition, this arrangement provides a constant pressure surface 18 for rocket operation.

FIGURE 4 illustrates the employment of the present invention with a combination air breathing jet-rocket engine wherein a plug 20, axially movable by any suitable means, is centrally positioned within the converging surface 11 to provide a variable throat area $A_t$ as the plug 20 is moved axially relative to the converging surface 11. In this arrangement, a circular rocket combustion chamber 21 is a central hole positioned within the plug 20.

The embodiment of FIGURE 4 provides a separation surface 15 for jet engine operation with the shroud 12 extended in a manner similar to that described above for the embodiment illustrated in FIGURES 1 and 2. The embodiment illustrated in FIGURE 4 further provides a separation surface 18 for rocket operation when the rocket combustion chamber 21 is employed for supersonic operation in a manner similar to that discussed above for the embodiment of FIGURE 3. The axially movable plug 20 further provides means for varying the annular throat area $A_t$ when the jet engine is being employed for subsonic operation.

FIGURE 5 illustrates a further embodiment of the present invention wherein the axially movable plug 20 supports an annular rocket combustion chamber 23. With the shroud 12 extended as shown in FIGURE 5, a separation surface 15 is provided for jet engine operation and a separation surface 18 is provided for rocket engine operation.

It should now be obvious that the above-described invention provides a flexible variable form and exit-area nozzle which is adaptable for employment with a jet propulsion aircraft engine or a combined jet propulsion-rocket aircraft engine. In addition, the present invention provides a controlled diverging surface between the throat of the jet engine, or the combustion chamber of the rocket engine, to the engine exit by the employment of a small annular scoop which insures an annular region of constant pressure to thereby provide the aforementioned diverging surface.

As will be evident from the foregoing description, certain aspects of the invention are not limited to the particular details of the construction of the examples illustrated, and it is contemplated that various and other modifications or applications will occur to those skilled in the art. It is therefore intended that the appended claims shall cover such modifications and applications as do not depart from the true spirit and scope of the invention.

What is claimed as new and desired to be secured by Letters Patent of the United States is:

1. A variable area exit nozzle for jet propulsion engines comprising:
    (a) a jet nozzle,
    (b) a cylindrical, axially movable shroud surrounding and radially spaced from said jet nozzle,
    (c) means for axially moving said shroud to an extended position relative to said jet nozzle, and
    (d) an annular scoop carried by and extending radially inwardly from said shroud to provide a supply of gas having sufficient pressure to form and maintain a constant pressure aerodynamic boundary which serves as a divergent nozzle surface extending between said jet nozzle and said shroud when said shroud is in the extended position.

2. A variable exit nozzle as defined in claim 1 wherein said jet nozzle is convergent and wherein said scoop forms an acute angle with the inner surface of said shroud.

3. A variable area exit nozzle as defined in claim 1 including an annular rocket combustion chamber peripherally surrounding said jet nozzle radially inward of said shroud.

4. The invention defined by claim 1 wherein the downstream end of the convergent jet nozzle contains an annular combustion chamber exhausting downstream.

5. The invention defined by claim 1 wherein an axially movable plug is positioned within said converging nozzle and is radially spaced therefrom, said plug containing a rocket combustion chamber exhausting downstream.

6. The invention defined by claim 5 wherein said rocket combustion chamber is an annulus.

7. The invention defined by claim 5 wherein said rocket combustion chamber comprises a central hole at the trailing end of said plug.

References Cited in the file of this patent

UNITED STATES PATENTS

| | | |
|---|---|---|
| 2,676,457 | Kramer | Apr. 27, 1954 |
| 3,012,400 | Corson | Dec. 12, 1961 |
| 3,049,876 | Connors | Aug. 21, 1962 |
| 3,068,645 | Alford | Dec. 18, 1962 |

FOREIGN PATENTS

| | | |
|---|---|---|
| 798,564 | France | Mar. 10, 1936 |